United States Patent [19]
Higgins

[11] 3,850,594
[45] Nov. 26, 1974

[54] FILTERING METHOD UTILIZING A DOUBLE-WALL FILTER BAG CONSTRUCTION

[75] Inventor: Frank Higgins, Millington, N.J.

[73] Assignee: Summit Filter Corporation, Summit, N.J.

[22] Filed: Feb. 26, 1974

[21] Appl. No.: 446,061

Related U.S. Application Data

[62] Division of Ser. No. 370,515, June 15, 1973, Pat. No. 3,826,066.

[52] U.S. Cl. ................................................. 55/97
[51] Int. Cl. ........................................... B01d 46/02
[58] Field of Search .. 55/96, 97, 302, 341, 379–381

[56] References Cited
UNITED STATES PATENTS

| | | | |
|---|---|---|---|
| 3,092,417 | 6/1963 | Hedberg | 55/379 |
| 3,509,698 | 5/1970 | Medcalf | 55/302 |
| 3,568,413 | 3/1971 | Jerabek | 55/467 |
| 3,606,736 | 9/1971 | Leliaert, et al. | 55/302 |
| 3,729,903 | 5/1973 | Espeel et al. | 55/302 |

FOREIGN PATENTS OR APPLICATIONS

| | | | |
|---|---|---|---|
| 273,741 | 5/1914 | Germany | 55/380 |
| 246,039 | 1/1926 | Great Britain | 55/380 |
| 887,772 | 1/1962 | Great Britain | 55/379 |
| 1,206,544 | 9/1970 | Great Britain | 55/378 |
| 873,744 | 4/1942 | France | 55/380 |
| 2,094,635 | 4/1972 | France | 55/341 |

OTHER PUBLICATIONS

Double Wall Dust Filter In Pollution Prevention Reprint from January 1, 1973, Chemical Processing, pp. 1 & 2.

*Primary Examiner*—Bernard Nozick

[57] ABSTRACT

A method of filtering to remove contaminants from contaminant ladened air, using a double-wall filter bag of flexible construction suspended in a housing by means of a rigid frame, with the inner bag being resiliently supported, and upon forcing air through the bag, the inner bag will mechanically move to facilitate cleaning action of the bag during a reverse flushing cycle.

The double-wall dust and the like filter bag includes an inner bag surrounded coaxially by an outer bag, the bags consisting of gas permeable and solid retention type of fabric, there being an annular space between the bags, the flow direction of contaminant ladened gases through the filter bag being such that both the interior surface of the inner bag and the exterior surface of the outer bag are exposed to the contaminant ladened gases. Solids are retained by these two surfaces with clean gas flowing into the annular space to exit from an open top of the construction. In a preferred form a double-wall cartridge consists of a wire cage supporting the inner and outer filter bags and providing the annular space between them. The construction very substantially increases effective filter area for cartridge dimensions and collective capacity; pressure drop across the bag is reduced and the decreased strain improves fabric life and efficiency, and the cartridges are readily adaptable to reverse pulse and reverse air dust collectors.

5 Claims, 6 Drawing Figures

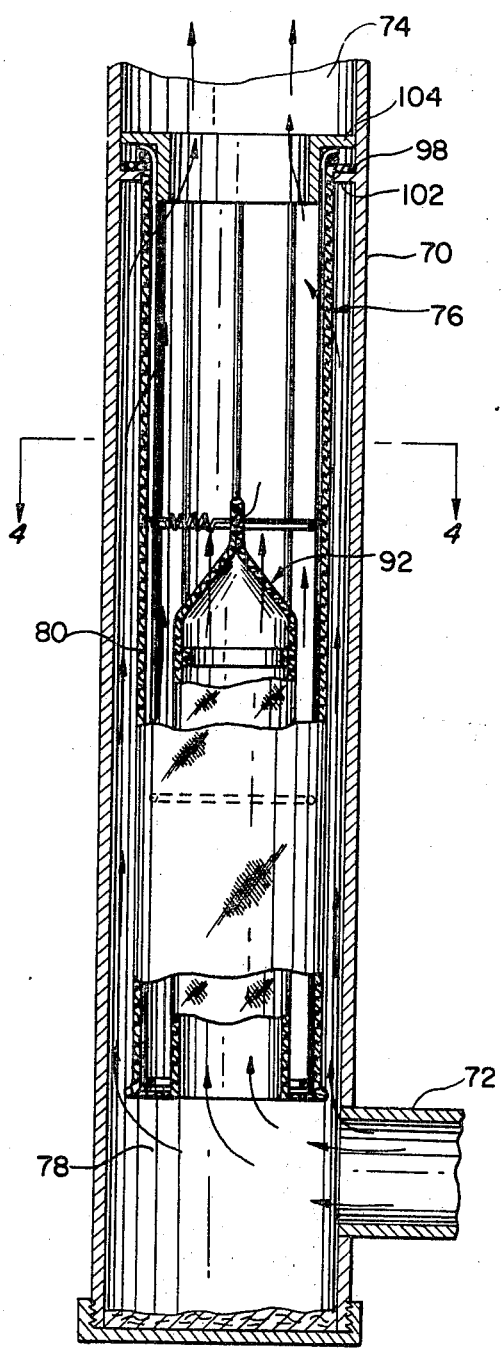
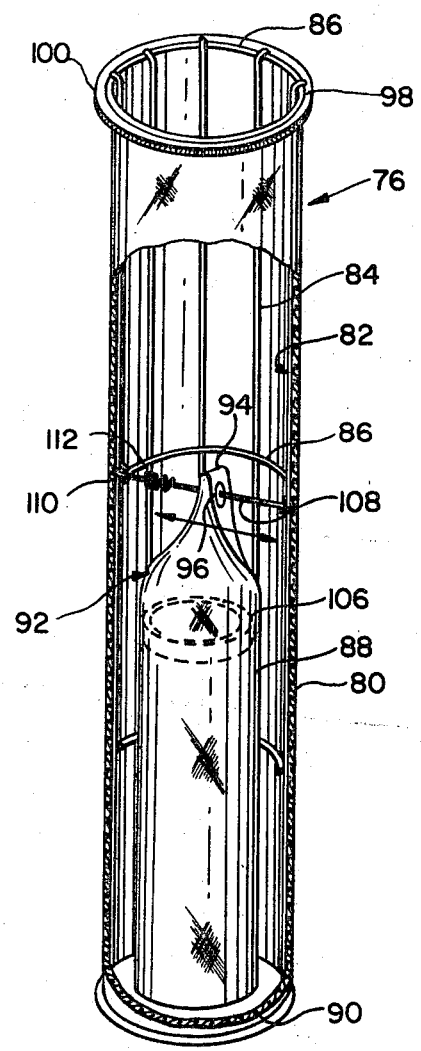
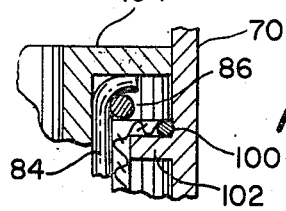
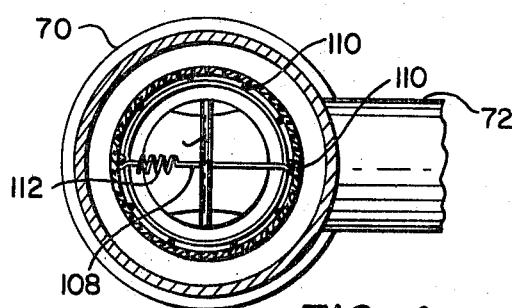

FILTERING METHOD UTILIZING A DOUBLE-WALL FILTER BAG CONSTRUCTION

CROSS REFERENCES TO RELATED APPLICATIONS:

This application is a division of co-pending application Ser. No. 370,515, filed June 15, 1973, now U.S. Pat. No. 3,826,066 entitled: DOUBLE FILTER BAG construction.

BACKGROUND OF THE INVENTION:

In the field of gas-solids separation a great need exists for filtering constructions and methods capable of filtering contaminants from air and other gaseous materials with a high degree of efficiency and at the same time the construction and method of use must be susceptable to relatively low manufacturing, maintenance and operating costs and providing increased efficiency in minimum dimensional sizes.

The filter bag construction preferrably should be capable of simple installation adapted for fitting any standard collector with no substantial modification to the collector needed.

These and other requirements and desires of the industry are met by the present invention.

SUMMARY OF THE INVENTION:

The present invention provides a method of filtering using a double-wall dust collector or filter which includes an inner bag surrounded coaxially by an outer bag. The inner and outer bag are interconnected at one end to form a closed bottom plenum chamber between the inner and outer bags. Both the interior surface of the inside bag and the exterior surface of the outside bag are exposed to the dust ladened gases. Solids are retained by these two surfaces, and the clean gas flows into the annular space to exit from the open top of the unit. The construction provides greatly increased filter material area for the size of the unit and the collector can be, for example 60 percent smaller while having increased efficiency. With the highly increased air to cloth ratio a substantial decrease in pressure drop is obtained with reference to the velocity through the bag. The decrease in pressure drop from inlet to outlet of a collector unit permits a decrease in velocity of air flow. The increase of air to cloth ratio and decreased velocities results in increased cleaning efficiency.

In a preferred embodiment the double-wall cartridge as a unit includes a rigid wire cage suspending and supporting the two filter bags in a housing and the unit is readily adapted for replacement of conventional filter bags in most dust collectors, including the normal top removal type. The inner bag is resiliently supported in a manner whereby, during a bag cleaning cycle, the inner bag is mechanically moved by air flow therethrough.

Additional objects, advantages and features of the present invention will be more readily apparent from the following detailed description of embodiments thereof when taken together with the accompanying drawings in which:

FIG. 3 is a view similar to FIG. 1 showing another form of the invention incorporating the principles of the invention and mounted within a dust collector unit;

FIG. 4 is a sectional view taken on line 44 of FIG. 3;

FIG. 5 is a perspective view of the double filter bag cartridge or unit per se, partly broken away for clarity of detail; and FIG. 6 is a fragmentary sectional view of the corner of the double filter bag unit and mounting therefor.

Figures 1, 2:
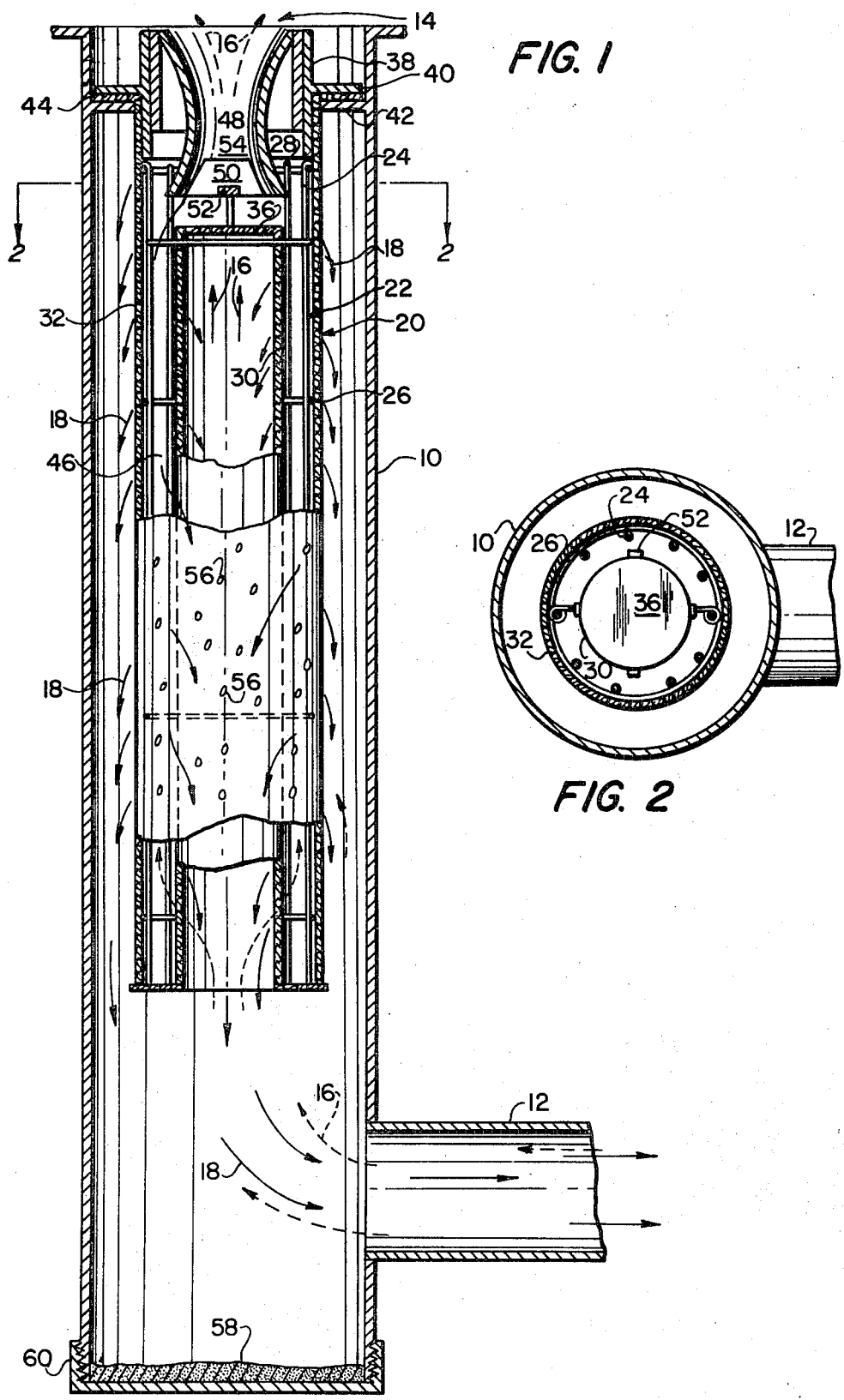
FIG. 1 is a vertical sectional view, partly broken away, of a double filter bag according to the invention disclosing one form of construction thereof.
FIG. 2 is a sectional view taken on line 22 of FIG. 1.

Referring now in greater detail to the drawings, in FIG. 1 there is shown a dust collector housing or casing 10 which is, for illustrative purposes only, and representative of any known and used types of structures. The housing includes an inlet generally designated 12 and an outlet generally designated 14. The direction of air flow in operation is indicated by arrows 16 or broken line configuration. Arrows 18 of solid line construction indicate air flow during a reverse air flow cycle used for cleaning of the filter bag unit. The reverse flow cleaning cycle will be explained in greater detail hereinafter.

A double filter bag construction in accordance with the invention is shown as a double-wall cartridge 20 and includes a rigid wire cage 22 having a plurality of vertical wires 24 in circumferentially spaced relationship and interconnected by means of rings 26. The uppermost ends of wires 24 are, as shown, at 28 bent around the upper ring and secured thereto. The top and bottom of the cage are open.

The double-wall filter unit includes an inner bag 30 and an outer bag 32 which are interconnected by an annular bottom 34 which serves to coaxially space the inner and outer bags. The inner bag 30 has a closed top. The cage 22 serves as a mounting means for the outer bag 32 and the construction including the annular bottom maintains the outer and inner bags in co-axially spaced relationship. Support means for the unit in the embodiment of FIG. 1 includes a cylindrical sleeve 38 having flange 40 for coacting with an inwardly directed flange 42 on the casing to secure therebetween an outwardly directed pre-formed or bent flange portion 44 of outer bag 32. In some constructions as will appear hereinafter different mounting means are used depending upon the construction of the collector housing in which the cartridge or unit is used.

The filter fabric can, as normal in the art, consist of cotton, wool, dacron, nylon, polypropylene, orlon, teflon, nomex, and felted materials of other types and natures.

It will be seen by flow arrows 16 that dust ladened or contaminated air entering through inlet 12 passes through the open bottom of the double-wall unit, thence through the material of inner bag 30 into chamber 46 between the two bags while air also passes through the exterior of outer bag 32 into chamber 46 and thence is exhausted to the atmosphere or other appropriate apparatus normal in the art. The relationship of the height of the inner bag to the outer bag is such as to utilize the greatest filtering length commensurate with practical considerations and the double filter walls provided by the inner and outer bag very substantially increases the filter area or air to cloth ratio up to 60 percent and above as compared with single walled filter units. The construction also permits a reduction in pressure drop and velocities during operation while maintaining this high degree of filtering. As will be obvious, the annular bottom 34 can be integrally formed or preferrably separate from the bags and sewn thereto.

To effect a cleaning of the double filter bag there is, as shown in FIG. 1, a venturi throat 48 secured in the sleeve 38 with the upper end of the venturi connected to the upper end of the sleeve and the lower end projecting beyond the lower end of the sleeve and spaced inwardly from the inner wall of outer bag 32 and upwardly from the closed top 36 of the inner bag. A diffuser cone 50 is secured within the lower end of the venturi throat by a spider means including a plurality of relatively short radially extending connecting bars 52 or the like. The diffuser cone tapers downwardly and outwardly as shown to the lower end which is flush with the lower end of the venturi. An annular flow passage 54 is defined between the outer surface of the diffuser cone and the lower end of venturi 48 with the flow passage being at an outwardly disposed angle with the discharge flow therefrom in substantial alignment with the annular space 46 between the inner and outer filter bags.

During a filtering operation the contaminant ladened air flows from the inlet upwardly around outer filter bag and simultaneously into the interior of the inner filter bag, through the walls of the inner and outer filter bags and up through the passage-way 46 to the outlet. Dust or other contaminants filtered are collected on the inner surface of the inner filter bag and on the outer surface of the outer filter bag.

When it is desired to remove the contaminants from the two bags, a reverse flow of air or other gaseous material is caused to flow as indicated by arrows 18 which passes through the venturi and past the diffuser cone into the annular space between the inner and outer filter bags. The venturi increases the velocity of the air and the annular flow passage 54 directs the air or gaseous material into the space between the bags with sufficient force to cause the air to pass through the inner and outer bags to dislodge dust or other contaminants from the filter bags as it passes through the walls thereof. When the air passes through the bags, it forms small bubbles indicated at 56 which are caused to move downwardly along the bags by the flow of air and carry dust and other contaminants to the bottoms of the housings and collect as at 58 from which they can be appropriately removed by removal of, for example, screw threaded cap 60. This reverse cleaning and bubble formation is unique and represents a substantial difference and improvement over conventional devices which cause the dust to collect at the top of the bag from where it must be removed by a further operation.

As will appear hereinafter, different methods of cleaning can be utilized including a jet pulse through the top of the unit or a plenum pulse used to isolate and pressurize a compartment. When using a plenum type of cleaning operation, the bag construction extends as close to the top as possible whereas in a jet pulse type a different construction is preferrably utilized. A construction of the invention ideally suited for a jet pulse type cleaning is illustrated in FIGS. 3–6 wherein the dust collector housing or casing is indicated at 70 having inlet 72 and an outlet at 74. A double-wall filter cartridge in accordance with the invention indicated at 76 is again mounted within the housing with the flow of gas or air containing contaminants being shown at 78. The double-wall cartridge agains consists of an outer bag 80 similarly mounted on a rigid wire cage 82 having vertical wires 84 and rings 86. An inner bag 88 is coaxially positioned within outer bag 80 and connected by an annular ring 90 in a manner similar to the other embodiment. Inner bag 88 differs from inner bag 30 of the previous embodiment in that the upper end 92 thereof is flattened as shown by folding or the like of the material of the bag and terminates in a substantially flat elongated upper end terminus at 94. This portion is perferrably provided with an opening and grommet with a hole as at 96.

The upper end of outer bag 80 has an outwardly directed flange 98 secured thereto by stitching or the like and attached thereto at its outer edge is a metal ring 100 or the like. Mounting of this cartridge is effected by supporting the top flange on inwardly directed flange 102 in the housing with the upper end ring of the wire cage mounted thereabove and interengaged on the upper end by sleeve 104 or the like.

In cleaning the double-wall bag construction and especially using a jet pulse type of cleaning it is necessary to support the inner bag since, otherwise, it would collapse. This is accomplished by mounting a ring or the like 106 inside of inner bag 88 in proximity to the inwardly turned portion at upper end 92. A wire 108 is passed through grommet 96 and has its ends 110 attached to opposed vertical wires 84 above a ring 86. A portion of the wire 108 is formed as a coiled spring 112 to provide resiliency to the wire. The grommet 96 has a sliding engagement on the wire 108. The height of the inner bag to the top suspension wire is critical in that the inner bag must be maintained taut and yet not so tight as to prevent its movement on the wire. When jet pulsing for cleaning the upper end of the inner bag can move and vibrate on the wire to give a snapping action to facilitate dislodgment of collected particles thereon. The movement must be limited, however, so that the inner bag does not contact the outer bag during vibration. In effect, a mechanical movement or vibration results during jet pulsing of the cleaning air. In this embodiment, as also in the previous embodiment, the material of the inner and outer bag are sufficiently flexible to permit a flexing or snap action. As air is drawn through during the cleaning cycle, the cage prevents collapse and the material is permitted to pop out during reverse flow for cleaning.

The double-wall cartridge of the present invention is ideally suited for top insertion in housings of a type currently in use. The construction permits simple installation to fit most standard collectors without modification of the collector. The invention provides up to 60 percent more filter cloth per bag and provides a lower pressure drop across the collector. The reduced horsepower requirements result in lower cost. Extended bag life is effected with less bags needed per collector while increasing the collection. Increased efficiency of bag cleaning is possible and the increased filtering volume eliminates the necessity for additional collectors.

When using a plenum type cleaning, no venturi is necessarily utilized and the inner bag can extend all the way to the top and a suspension wire at the top can be used.

In the embodiment of FIGS. 3–6 the upper end 92 of the inner bag effectively serves to break and distribute the cleaning flow of air and the sloping sides of this upper flattened, being impinged by the air, facilitate a mechanical shaking action of the inner bag and the so created turbulent air flow enhances the cleaning action.

Manifestly, minor changes in details of construction can be effected without departing from the spirit and scope of the invention as defined in and limited solely by the apended claims.

I claim:

1. A method of filtering contaminants from contaminant laden air comprising:
   A. forcibly passing air into a filter housing inlet and out a filter housing outlet, said outlet possessing an interior flange proximate said outlet;
   B. said contaminant laden air being caused to pass through a double-wall filter bag system contained within a filter housing, said system being characterized as containing:
      i. an elongated cylindrical cage mounted in said housing between said inlet and said outlet and including:
         a. circumferentially spaced side members defining openings therebetween;
         b. a plurality of vertically spaced cage rings interconnecting said side members, and a top ring supported on said housing flange and mounting said cage in said housing;
         c. said cage having open inlet and outlet ends;
      ii. a double-wall filter bag having an upper outwardly directed flange seated on said interior flange and suspendably mounting said bag in said housing;
      iii. said double-wall filter bag including:
         a. an outer cylindrical bag engaged over and encompassing the exterior of said cage and being in coaxial spaced relationship from the inner wall of said housing and defining therebetween an annular gas flow passage;
         b. a generally cylindrical inner bag mounted within said cage in coaxial spaced relationship from the inner wall thereof, and from the inner wall of said outer bag, and defining between said spaced outer and inner bags an annular gas flow chamber terminating in an inner open outlet end of said double-wall filter bag;
         c. said inner bag having an upper end formed by closing the wall material to a flattened terminal closed end having a transverse opening therethrough;
         d. a transverse wire loosely inserted through said transverse opening with the ends thereof connected to said cage in supporting said inner bag in a relatively taut condition within said outer bag and permitting a sliding suspension and vibratory movement of said inner bag with respect to said outer bag during a reverse gas flow cleaning cycle for said double-wall filter bag;
         e. an annular bottom wall interconnecting the bottoms of said outer and inner bags in said spaced relationship and integrating the bags into a unitary bag having a gaseous medium flow inlet and proximate said housing inlet;
         f. said inner bag extending from said inlet end of said double-wall filter bag a substantial distance toward but terminating prior to an opposite open outlet end of said double-wall filter bag;
         g. said outer bag at said open outlet end thereof being in substantially air sealed engagement with said inner flange;
         h. said inner and outer bags consisting of a gas permeable and particle contaminant impermeable flexible cloth filter bag; and
      iv. said cage and the transverse support wire for said inner bag maintaining the substantially coaxial relationship of said inner and outer bags during operation as a filtering system;
   C. passing said contaminant laden air through said filter housing inlet thus causing said air to pass along said annular gas flow passage and through the outer bag from the exterior thereof into said annular flow chamber between said bags, and through the inner bag from the interior thereof into said annular flow chamber, gas in said annular flow chamber passing therethrough to and exiting from said open outlet end, with contaminants being collected on the outer surface of said outer bag and the inner surface of said inner bag.

2. A method as in claim 1, wherein said double-wall filter bag and said cage are removably mounted in said housing.

3. A method as in claim 1, wherein said annular bottom wall consists of the same material as said inner and outer bags.

4. A method as in claim 1, wherein said wire has incorporated therein a helical spring section providing a resilient spring-like support for said closed end of said inner bag.

5. A method as in claim 1, wherein the contaminant laden air is forced through the filter housing in a manner to mechanically move and vibrate the inner bag.

* * * * *

UNITED STATES PATENT OFFICE
CERTIFICATE OF CORRECTION

PATENT NO. : 3,850,594
DATED : November 26, 1974
INVENTOR(S) : Frank Higgins

It is certified that error appears in the above–identified patent and that said Letters Patent are hereby corrected as shown below:

The term of this patent subsequent to July 30, 1991, has been disclaimed.

Signed and Sealed this

Twenty-fourth Day of August 1976

[SEAL]

Attest:

RUTH C. MASON
*Attesting Officer*

C. MARSHALL DANN
*Commissioner of Patents and Trademarks*